(12) United States Patent
Katakura et al.

(10) Patent No.: US 6,741,923 B2
(45) Date of Patent: May 25, 2004

(54) VEHICLE DRIVING FORCE CONTROL APPARATUS

(75) Inventors: Shusaku Katakura, Yokosuka (JP); Daisuke Yoshinoya, Zama (JP); Yasuhito Suzuki, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/423,917

(22) Filed: Apr. 28, 2003

(65) Prior Publication Data

US 2003/0216854 A1 Nov. 20, 2003

(30) Foreign Application Priority Data

May 16, 2002 (JP) ........................................ 2002-141528

(51) Int. Cl.[7] ................................................. B60T 7/12
(52) U.S. Cl. ........................ 701/101; 701/110; 701/115; 123/361
(58) Field of Search ................................. 701/101, 110, 701/116, 115, 103, 70; 123/361, 399

(56) References Cited

U.S. PATENT DOCUMENTS

| | | | | |
|---|---|---|---|---|
| 5,698,956 A | * | 12/1997 | Nishino et al. | 318/432 |
| 6,035,735 A | * | 3/2000 | Graf et al. | 74/335 |
| 6,056,667 A | * | 5/2000 | Sasaki | 477/174 |
| 6,188,950 B1 | * | 2/2001 | Tsutsumi et al. | 701/96 |
| 6,409,287 B1 | * | 6/2002 | Leach et al. | 303/146 |
| 6,418,369 B2 | * | 7/2002 | Matsumoto et al. | 701/80 |
| 6,565,482 B2 | * | 5/2003 | Kobayashi et al. | 477/174 |
| 6,574,535 B1 | * | 6/2003 | Morris et al. | 701/22 |

FOREIGN PATENT DOCUMENTS

JP   2001-105932 A   4/2001

* cited by examiner

Primary Examiner—John Kwon
(74) Attorney, Agent, or Firm—Shinjyu Global IP Counselors, LLP

(57) ABSTRACT

The vehicle driving force control apparatus includes a target driving force computing component that is configured to calculate a target driving force. The vehicle driving force control apparatus further includes a zone attribute detecting component that is configured to detect zone attributes and a requested driving force detecting component that is configured to detect a requested driving force. The target driving force computing component has a zone attribute compensation control section that is configured to calculate a compensation driving force according to the zone attribute being detected and a compensation driving force upper limit value setting section that is configured to set an upper limit value for the compensation driving force in response to the requested driving force. The compensation driving force limited with the upper limit value is used as a final compensation driving force.

36 Claims, 10 Drawing Sheets

CASE IN WHICH ZONE ATTRIBUTE CHANGES

CASE IN WHICH ZONE ATTRIBUTE COMPENSATION PORTION IS
ADDED ONLY TO TARGET DRIVING FORCE TRANSITIONAL PORTION

CASE IN WHICH ZONE ATTRIBUTE COMPENSATION PORTION IS
ADDED ONLY TO TARGET DRIVING FORCE TRANSITIONAL PORTION

ACCELERATION WHEN THERE IS A ZONE ATTRIBUTE COMPENSATION PORTION

VEHICLE DRIVING FORCE CONTROL APPARATUS

BACKGROUND OF THE INVENTION

1. Field of the Invention

The present invention generally relates to a vehicle driving force control apparatus. More specifically, the present invention relates to a vehicle driving force control apparatus that calculates a target driving force for a vehicle that corresponds to a driver's request and achieves the calculated target driving force by controlling an actual driving force generated by a drive train of the vehicle.

2. Background Information

One example of a vehicle driving force control apparatus of prior art is described in Japanese Laid-Open Patent Publication No. 2001-105932. The vehicle driving force control apparatus described in this publication is configured to obtain a requested vehicle driving force when traveling on connecting roads that join highways with general roads. This vehicle driving force control apparatus revises a normal target driving force that is calculated based on the accelerator operation amount and vehicle speed toward a larger value when it is determined that the vehicle is traveling on a connecting road that joins a highway with a general road.

In view of the above, it will be apparent to those skilled in the art from this disclosure that there exists a need for an improved vehicle driving force control apparatus. This invention addresses this need in the art as well as other needs, which will become apparent to those skilled in the art from this disclosure.

SUMMARY OF THE INVENTION

It has been discovered that, with the vehicle driving force control apparatus of prior art described above, there are situations in which the target driving force is revised to a larger value even when increasing the driving force is not desirable. For example, when this vehicle driving force control apparatus detects that the vehicle is on a connecting road that joins a highway with a general road based on map data from an onboard navigation system, it revises the target driving force to a larger value even though the vehicle was traveling at a low speed and increasing the driving force was undesirable. Since the target driving force is revised to a larger value, the driver has to back off the accelerator to maintain the vehicle speed.

The present invention was conceived in view of this problem. One object of the present invention is to provide a vehicle driving force control apparatus that can both eliminate unnecessary accelerator operation by the driver and respond suitably to zone attribute changes by taking into consideration a requested driving force requested by the driver when controlling the target driving force compensation in response to zone attributes.

In order to achieve the aforementioned object, a vehicle driving force control apparatus is provided that comprises a zone attribute detecting component, a requested driving force detecting component and a target driving force computing component. The zone attribute detecting component is configured and arranged to detect at least two different zones with different zone attributes in which a vehicle travels. The requested driving force detecting component is configured and arranged to detect a requested driving force requested by a driver. The target driving force computing component is configured to calculate a target driving force based on a requested driving force that is adjusted by a final compensation driving force. The target driving force computing component includes a zone attribute compensation control section and a compensation driving force upper limit value setting section. The zone attribute compensation control section is configured to calculate a compensation driving force according to which of the zone attributes is being detected. The compensation driving force upper limit value setting section is configured to set an upper limit value for the compensation driving force according to an amount of the requested driving force that is detected by the requested driving force detecting component. The target driving force computing component is further configured to set the final compensation driving force as a value that is obtained by limiting the compensation driving force calculated by the zone attribute compensation control section with the upper limit value of the compensation driving force.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

More specifically, the vehicle driving force control apparatus of the present invention adjust a driving force requested by the driver based on zone attributes in which the vehicle is traveling as explained below. By taking into consideration the driving force requested by the driver when executing compensation control of a target driving force in response to zone attributes, the present invention can obtain a target driving force that both eliminates unnecessary accelerator operation by the driver (when the amount of the driving force requested by the driver does not correspond to the driver acceleration request distribution change determined by the zone attribute). Moreover, the vehicle driving force control apparatus is well suited to the change in zone attribute (when the amount of the driving force requested by the driver does correspond to the driver acceleration request distribution change determined by the zone attribute).

The target driving force is adjusted by the zone attribute compensation driving force when there is a change in a request for acceleration by the driver. However, during steady state travel where the driver does not intend to accelerate, there is no request for acceleration by the driver. Therefore, compensations with respect to zone attribute should not be applied to the steady state target driving force. In other words, when the zone attribute changes and the compensation amount with respect to the change in acceleration intention of the driver has been determined, the following processing operations are performed: (a) compensation is not applied to the steady state target driving force; and (b) the compensation amount is changed by an amount that represents the acceleration intention of the driver. It is also necessary to prevent the compensation from becoming unnecessarily large when there is no request for acceleration by the driver. Thus, the following specific measures can be considered: (1) set the upper limit value based on the accelerator operation amount and minimize the zone attribute compensation value when there is no accelerator operation; and (2) when the target driving force determination section is divided into a steady state portion and a transitional portion that computes the compensation amount in response to the change in the steady state portion, apply compensation to the transitional portion only. Measure (1) is used in the first embodiment while measure (2) is used in the second embodiment. A combination of measures (1) and (2) is used in the third embodiment.

First Embodiment

Figure 1:
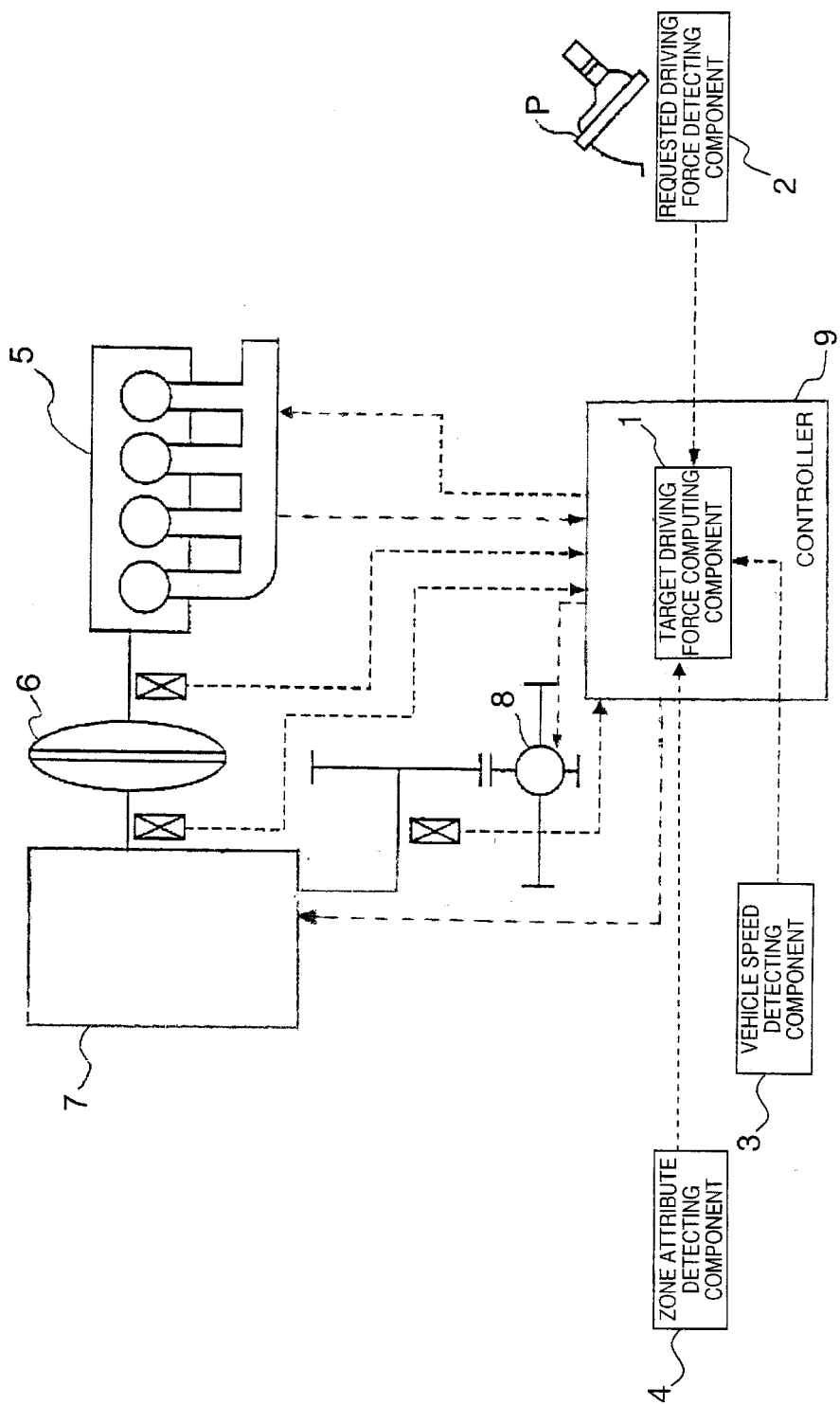
FIG. 1 is a schematic block diagram of a vehicle equipped with a vehicle driving force control apparatus in accordance with a first embodiment of the present invention.

Referring initially to FIG. 1, a schematic block diagram of a vehicle equipped with a vehicle driving force control apparatus is illustrated to explain a first embodiment of the present invention. Specifically, FIG. 1 shows a power train and a control system thereof for a vehicle equipped with a driving force control apparatus in accordance with the first embodiment of the present invention.

As seen in FIG. 1, the vehicle is equipped with a controller 9 that includes a target driving force computing component 1 in accordance with the first embodiment. Moreover, the controller 9 and the target driving force computing component 1 are operatively coupled to a requested driving force detecting component 2, a vehicle speed detecting component 3 and a zone attribute detecting component 4. In this first embodiment, the requested driving force detecting component 2 is preferably configured and arranged to detect an accelerator operation amount that corresponds to an amount by which the driver operates an accelerator pedal P. Therefore, the requested driving force detecting component 2 is configured and arranged to detect the accelerator operation amount and produce an input signal indicative of an accelerator operation amount, which is sent to the controller 9. The vehicle speed detecting component 3 is configured and arranged to detect the traveling speed of the vehicle and produce an input signal indicative of a traveling speed, which is sent to the controller 9. The zone attribute detecting component 4 is configured and arranged to detect the zone attributes corresponding zones in which the vehicle travels and produce an input signal indicative of a zone attribute, which is sent to the controller 9.

The controller 9 preferably includes a microcomputer with a control program that controls the driving force of the vehicle as discussed below. More specifically, the controller 9 is preferably operatively coupled to the power train of the vehicle such as an engine 5, a torque converter 6, a transmission 7 and/or a transfer case 8 to achieve the target driving force computed by the target driving force computing section 1 in the power train of the vehicle. These components of the power train of the vehicle are conventional components that are well known in the art. Since these components are well known in the art, these structures will not be discussed or illustrated in detail herein. Moreover, it will be apparent to those skilled in the art from this disclosure that the power train of the vehicle can include any structure and combination of components as long as the actual target driving force generated by the power train is able to be adjusted.

The controller 9 can also include other conventional components such as an input interface circuit, an output interface circuit, and storage devices such as a ROM (Read Only Memory) device and a RAM (Random Access Memory) device. The memory circuit stores processing results and control programs that are run by the processor circuit. The controller 9 is operatively coupled to the various sensing devices or sensors in a conventional manner. The internal RAM of the controller 9 stores statuses of operational flags and various control data. It will be apparent to those skilled in the art from this disclosure that the precise structure and algorithms for the controller 9 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Thus, the controller 9 is preferably configured as an engine controller comprising an onboard microcomputer or a traction controller into which the target driving force computing component 1 is built as a target driving force computing program. Of course, it will be apparent to those skilled in the art from this disclosure that the target driving force computing component 1 can be built into any controllers that will carry out the function of achieving the computed target driving force in the power train of the vehicle. Moreover, it will also be apparent to those skilled in the art from this disclosure that the target driving force computing component 1 can be a separate component that is configured and arranged to directly receive the input signals from the requested driving force detecting component 2, the vehicle speed detecting component 3 and the zone attribute detecting component 4, and communicate the computed target driving force with a controller that will carry out the function of achieving the computed target driving force in the power train of the vehicle.

Figure 2:
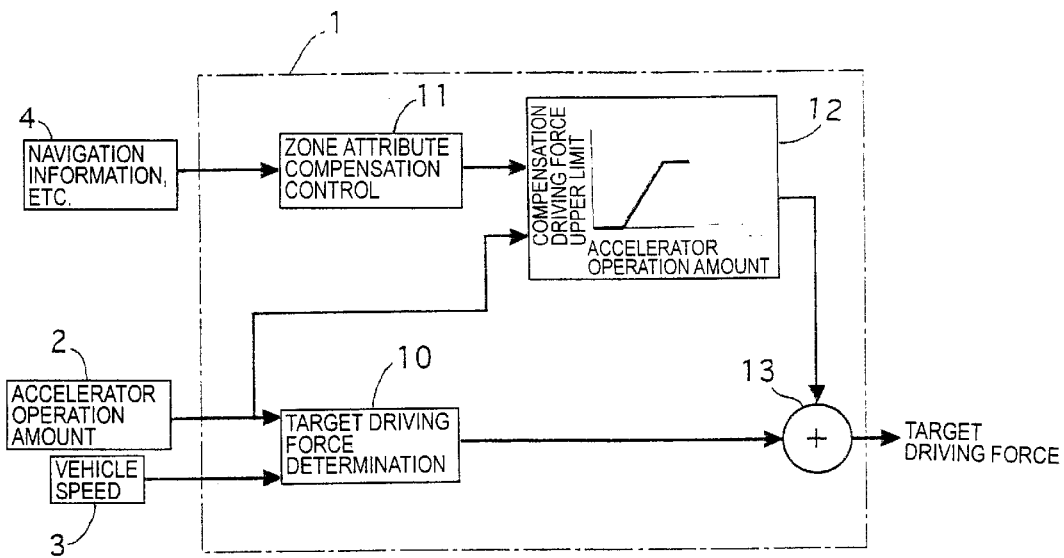
FIG. 2 is a block diagram showing the vehicle driving force control apparatus of FIG. 1 in accordance with the first embodiment of the present invention.

FIG. 2 is a block diagram showing the vehicle driving force control apparatus in accordance with the first embodiment. As seen in FIG. 2, the vehicle driving force control apparatus of the first embodiment basically comprises the target driving force computing component 1, the requested driving force detecting component 2, the vehicle speed detecting component 3, and the zone attribute detecting component 4. The target driving force computing component 1 further comprises a target driving force determination section 10, a zone attribute compensation control section 11, a compensation driving force upper limit value setting section 12, and an adder 13.

As described above, the target driving force computing component 1 is configured and arranged to compute a target driving force that reflects a driver's request using information obtained from the requested driving force detecting component 2, the vehicle speed detecting component 3 and the zone attribute detecting component 4.

The requested driving force detecting component 2 is configured and arranged to detect a requested driving force that corresponds to a driver's request. As described above, in this first embodiment, the requested driving force detecting component 2 is preferably an accelerator operation amount detecting component that is configured and arranged to detect an accelerator operation amount by which the driver operates the accelerator pedal P. Of course, it will be apparent to those skilled in the art from this disclosure that the requested driving force detecting component 2 can be any device that detects the requested driving force measured from the accelerator operation of the driver, such as accelerator operation amount, throttle valve opening, engine intake volume, or the rate of change of any of these values.

The vehicle speed detecting component 3 is configured and arranged to detect a vehicle speed. Of course, it will be apparent to those skilled in the art from this disclosure that the vehicle speed detecting component 3 can be any component that has a function of detecting a vehicle speed, such as a transmission output shaft rotation sensor or a wheel speed sensor.

The zone attribute detecting component 4 is configured and arranged to detect zone attribute information describing what type of road the vehicle is traveling on, e.g., highway, general road, narrow alley, congested road. A "road type" as used herein means a road that is characterized or classified based upon at least one of the following factors: speed limit, type of access, number of intersections, number of lanes, and the like. In this first embodiment, the zone attribute detecting component 4 is preferably an onboard navigation system that acquires road information, map data, and congestion information. However, it will be apparent to those skilled in the art from this disclosure that the zone attribute detecting component 4 can also be any receiver or the like that receives road information from infrastructure installed along roads.

More specifically, the zone attribute detecting component 4 of the first embodiment preferably includes the onboard navigation system that calculates the current position periodically according to a fixed cycle using three types of signal that are indicative of: a traveling distance of the vehicle determined from a vehicle speed sensor, a turning angle of the vehicle determined from a gyro (angular velocity sensor), and a traveling direction of the vehicle determined from a GPS antenna (GPS information). The current position is identified by comparing or map matching the calculated current position to map data. The map data is read from a map CD-ROM stored in a CD-ROM drive and indicated on a display as a current position mark.

As used herein to describe and claim the present invention, a "zone attribute" is defined an external environmental factor that does not affect the vehicle physically but changes the vehicle behavior desired by the driver, e.g., highway, general road, narrow alley, or congested road. In this definition, hills, snowy roads, wet roads, etc., are not the zone attributes because these external environmental factors change the traveling resistance of the vehicle and the gripping force of the tires with respect to the road surface and thus, affect the vehicle physically. In the first embodiment of the present invention, roads are divided into four zone attributes, i.e., highway, general road, alley/narrow road, and congested road. Of course, it will be apparent to those skilled in the art from this disclosure that it is also acceptable for other external environmental factors that do not affect the vehicle physically to be used as zone attributes. Moreover, it is also acceptable to divide the zone attributes into smaller categories by adding such factors as road width, road curvature, and degree of congestion to determine a zone attribute driving force, decrease/increase rates of a compensation value, based on these categories.

The target driving force determination section 10 of the target driving force computing component 1 is configured to determine an initial target driving force (i.e., steady state target driving force) based on the vehicle speed detected by the vehicle speed detecting component 3 and an absolute value of the accelerator operation amount detected by the requested driving force detecting component 2. More specifically, the target driving force determination section 10 is configured to use an accelerator operation amount versus convergent vehicle speed characteristic determined based on the traveling resistance during steady state travel to determine the steady state target driving force, which is defined mainly in relation to the vehicle speed.

The zone attribute compensation control section 11 of the target driving force computing component 1 is configured to calculate a compensation driving force that represents the amount by which the driver's desired acceleration distribution changes due to a difference zone attributes detected by the zone attribute detecting component 4.

For example, on a highway, as opposed to a general road, there are no traffic lights or intersections. Therefore, the vehicle can travel for a long period of time while maintaining a higher speed. Thus, the operations that a driver performs to accelerate or decelerate a vehicle while traveling on a highway below a certain vehicle speed region are limited to deceleration for the purpose of stopping and acceleration toward the speed limit of the highway from a stopped condition. Consequently, when the vehicle is on a highway and driving in the certain vehicle speed region, it is desired to achieve a larger driving force during acceleration than when the vehicle is on a general road.

On the other hand, on an alley or a narrow road, there are usually many intersections and obstacles. Therefore, the average vehicle speed is in a low vehicle speed region. Moreover, the driver constantly repeats the operations of stopping and accelerating slowly. Thus, in this low vehicle speed region, it is desired for the vehicle to respond to the acceleration operation of the driver with an acceleration that is of higher resolution and more gradual in order to improve the controllability experienced by the driver. Consequently, in this low vehicle speed region, it is desired to achieve a smaller driving force during acceleration than on general roads.

Accordingly, the compensation driving forces calculated by the zone attribute compensation control section 11 preferably include positive compensation driving forces that increase the target driving force and negative compensation driving forces that decrease the target driving force. In other words, when roads are divided into the zone attributes including highway, general road, and alley (narrow road), the driver's desired acceleration distribution is highway >general road >alley. Thus, the zone attribute compensation control section 11 is configured to calculate a large positive compensation driving force when the vehicle is on a highway. Also, the zone attribute compensation control section 11 is configured to calculate a small compensation or zero compensation driving force when the vehicle is on a general road. Moreover, the zone attribute compensation control section 11 is configured to calculate a negative compensation driving force when the vehicle is on an alley/narrow road. When any of these roads is congested, the calculated compensation driving force is decreased by a predetermined value that corresponds to a change in a desired driving force due to the congestion.

Figure 3:
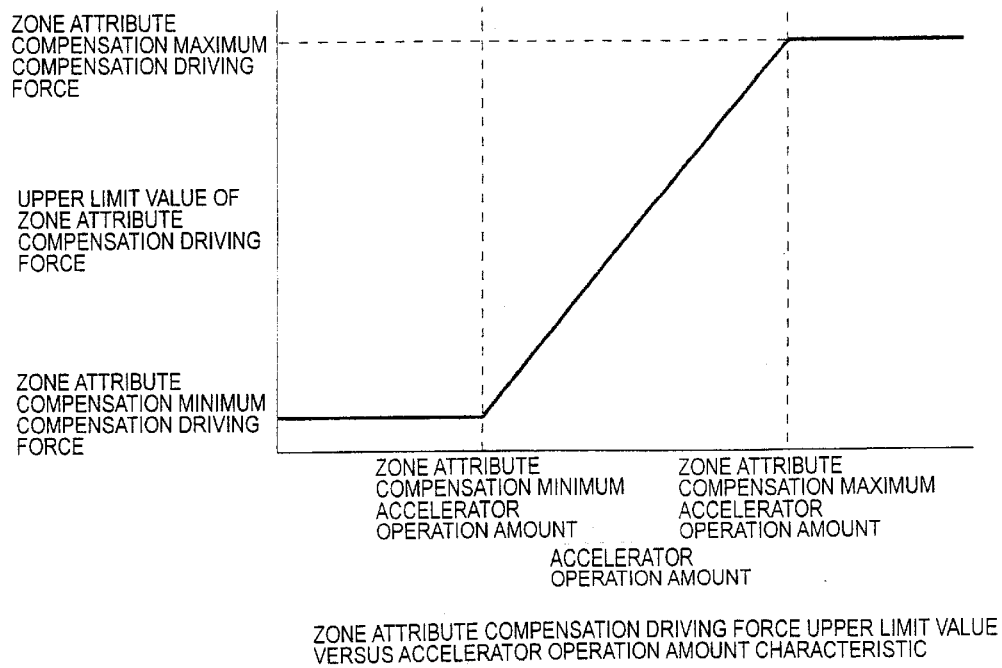
FIG. 3 is a graph showing a zone attribute compensation driving force upper limit value characteristic in accordance with the first embodiment of the present invention.

The compensation driving force upper limit value setting section 12 of the target driving force computing component 1 is configured to set an upper limit value of the compensation driving force. More specifically, the compensation driving force upper limit value setting section 12 is configured to set the upper limit value of the compensation driving force in response to a value of the accelerator operation amount (the requested driving force) detected by the requested driving force detecting component 2, as shown in FIG. 3.

In other words, the compensation driving force upper limit value setting section 12 is configured to set the upper limit value to a zone attribute compensation minimum compensation driving force when the accelerator operation amount is less than or equal to a zone attribute compensation minimum accelerator operation amount (a first prescribed operation amount). The compensation driving force upper limit value setting section 12 is configured to set the upper limit value to a value that is proportional to the accelerator operation amount when the accelerator operation amount is between the zone attribute compensation minimum accelerator operation amount and a zone attribute compensation maximum accelerator operation amount (a second prescribed operation amount). The compensation driving force upper limit value setting section 12 is configured to set the upper limit value to a zone attribute compensation maximum compensation driving force when the accelerator operation amount is greater than or equal to the zone attribute compensation maximum accelerator operation amount. As a result, the change in compensation driving force (change in upper limit value) can be achieved smoothly and without sudden changes when the accelerator is depressed while the vehicle is traveling.

The zone attribute compensation minimum accelerator operation amount is preferably set to an accelerator operation amount at which the driver's intention to maintain the vehicle speed is clear. The zone attribute compensation minimum compensation driving force is preferably set to a compensation driving force value corresponding to steady state travel on a road type with a zone attribute that has a larger positive value of the compensation driving force. The zone attribute compensation maximum accelerator operation amount is preferably set to an accelerator operation amount at which the driver's intention to accelerate is clear. The zone attribute compensation upper limit compensation driving force is preferably set to a compensation driving force value corresponding to a prescribed upper limit of compensation value based on a road type with a zone attribute that has a larger positive value of the compensation driving force.

Moreover, the compensation driving force upper limit value setting section 12 is further configured not to limit the compensation driving force based on the accelerator operation amount when the target driving force is decreased by the compensation driving force calculated based on the zone attribute. If the upper limit value limitation based on the accelerator operation amount is executed when the zone attribute compensation value is a negative value, such as when the vehicle is on an alley/narrow road, then the increase and decrease of the accelerator operation amount and the target driving force will be reversed. Thus, this limitation should not be executed in such a case. Therefore, the zone attribute compensation minimum compensation driving force is preferably set to a value of zero or greater. Accordingly, when the compensation driving force is a negative value that decreases the target driving force, the limitation on the compensation driving force, which is based on the accelerator operation amount by the driver, automatically ceases to be in effect. As a result, a feeling of abnormality during the accelerator operation can be eliminated when the target driving force is decreased by the zone attribute compensation driving force.

As described above, the compensation driving force calculated by the zone attribute compensation control section 11 is limited by the upper limit value set by the compensation driving force upper limit value setting section 12. Then, the resulting value is outputted to the adder 13 as a final compensation driving force, which is used to adjust the target driving force that was determined by the target driving force determination section 10.

In particular, the adder 13 is configured to add the initial target driving force (steady state target driving force) from the target driving force determination section 10 and the final compensation driving force from the compensation driving force upper limit setting section 12 together. The resulting sum value from the adder 13 is outputted as the final target driving force.

The target driving force outputted by the adder 13 is received by a driving force control component of the vehicle. The driving force control component is preferably configured and arranged to control the actual driving force imparted to the drive wheels so as to match the target driving force. Of course, it will be apparent to those skilled in the art from this disclosure that the driving force control component can be any device such as a drive output control component for an engine, motor, or other drive source, a gear ratio control means for a transmission provided so as to be connected to the drive source, or a system that combines a drive source output control means and a gear ratio control means.

Next, the operation of the vehicle driving force control apparatus in accordance with the first embodiment will be described.

As described above, the distribution of driver's desired acceleration differs depending on the type of road on which the vehicle is traveling. For example, on highways, contrary to general roads, the main types of accelerator operation are for maintaining constant speed travel in the vicinity of a designated speed limit and occasionally for accelerating for passing. At a speed region below a certain vehicle speed, the types of accelerator operations are limited to deceleration for the purpose of stopping and acceleration from a stopped condition toward the designated speed limit. These differences are defined changes in the driver's desired acceleration depending on the zone attribute. Thus, a particular accelerator response is assigned to each zone attribute such that depressing or releasing the accelerator pedal P causes the vehicle to respond differently when the vehicle is traveling in the different zones.

With respect to such changes in the driver's desired acceleration depending on the zone attribute, the change in zone attribute is read from map data of a navigation system, and the target driving force is changed in response to the change in the driver's desired acceleration at that zone attribute. For example, on a highway, the driving force achieved in response to depressing the accelerator with a certain amount will be preferably larger than the driving force achieved on a general road in response to depressing the accelerator with the same amount. On the other hand, on an alley/narrow road, the driving force achieved in response to depressing the accelerator with a certain amount will be preferably smaller than the driving force achieved on a general road in response to depressing the accelerator with the same amount. Thus, a vehicle driving force characteristic that matches the current road environment or the zone attribute can be achieved. However, if the driving force is increased or decreased based solely on the zone attribute, then the target driving force is increased or decreased even when increasing or decreasing the target driving force is not desirable.

Figure 4:
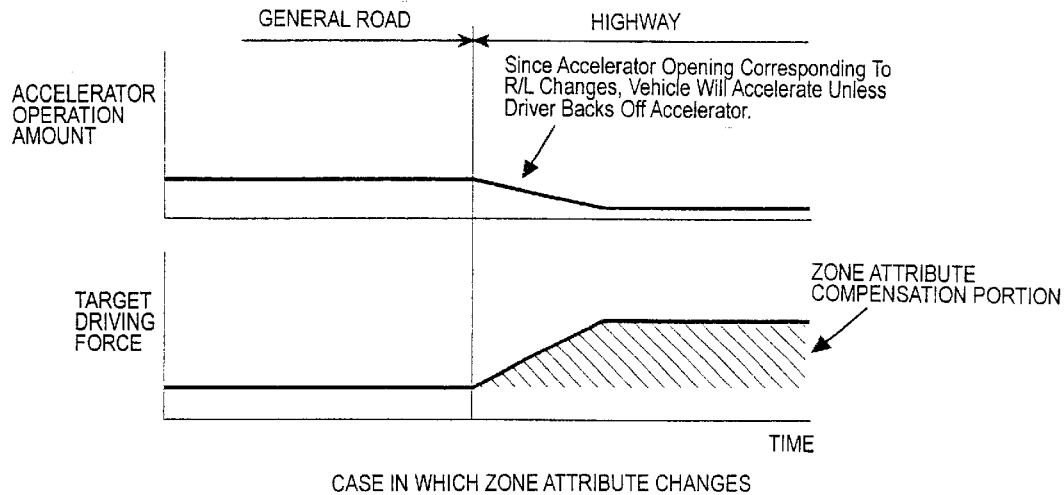
FIG. 4 is a graph showing an accelerator operation amount characteristic and a target driving force characteristic for a vehicle equipped with a prior art type of vehicle driving force control apparatus as the vehicle transfers from a general road to a highway.

For example, FIG. 4 is a diagram showing an accelerator operation amount characteristic and a target driving force characteristic for a case in which the target driving force is adjusted by a zone attribute compensation driving force without any consideration in an accelerator operation amount. When a vehicle transfers from a general road to a highway, a zone attribute that corresponds to the highway is detected based on map data from a navigation system, and thus, the target driving force is adjusted to a larger value. However, since there is no limitation on the zone attribute compensation driving force based on the accelerator operation amount, the target driving force will be adjusted even if the vehicle is traveling at a low speed for which increasing the driving force is undesirable. If the target driving force is adjusted to a larger value when the vehicle is traveling at a low speed, the driver will need to back off the accelerator to maintain the vehicle speed, as seen in FIG. 4. In other words, since the zone attribute compensation increases the driving force in the same manner as when the accelerator is depressed, the vehicle will accelerate if the driver does not back off the accelerator.

Figure 5:
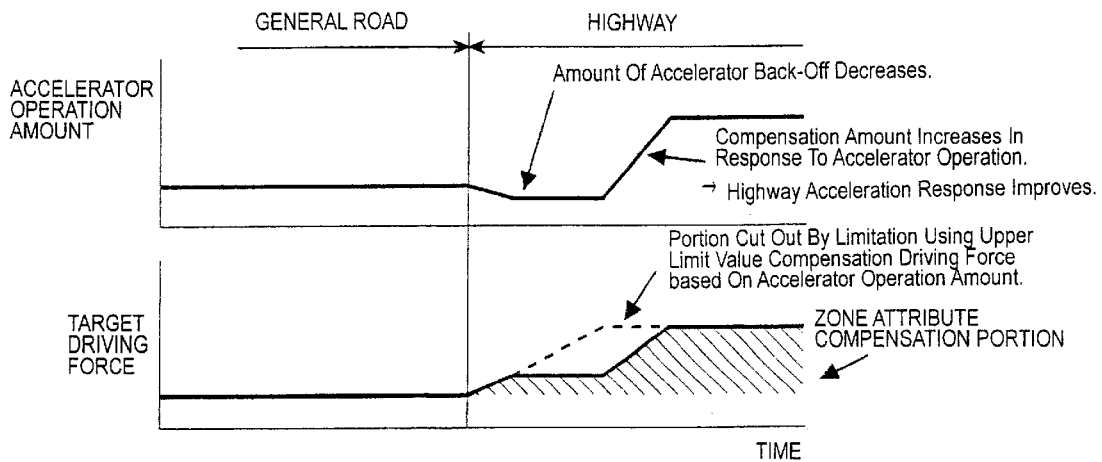
FIG. 5 is a graph showing an accelerator operation amount characteristic and a target driving force characteristic for the vehicle equipped with the vehicle driving force control apparatus of the first embodiment of the present invention as the vehicle transfers from a general road to a highway.

On the other hand, as seen in FIG. 5, with the vehicle driving force control apparatus in accordance with the first embodiment, the target driving force is adjusted by a compensation driving force that is limited by a value determined based on the accelerator operation amount. More specifically, the compensation driving force calculated by the zone attribute compensation control section 11 is limited by the compensation driving force upper limit value setting section 12. Therefore, the compensation driving force based on the zone attribute is significantly reduced in regions in which the accelerator operation amount is relatively small. Consequently, as shown in FIG. 5, when the vehicle moves from a general road to a highway, most of the zone attribute compensation portion is reduced by the upper limit value limitation which is based on the accelerator operation amount. As a result, the amount by which the driver has to back off the accelerator to maintain the vehicle speed in the initial stage of transferring from the general road to the highway is reduced.

Thus, when the zone attribute changes, e.g., when transferring from a general road to a highway, and the driver keeps the accelerator operation amount small with the intention of maintaining the vehicle speed, the vehicle driving force control apparatus eliminates unnecessary accelerator operation. In other words, the compensation driving force based on the zone attribute is substantially reduced in these regions where the driver keeps the accelerator operation amount small.

Furthermore, when the accelerator is depressed after transferring to the highway, the compensation driving force based on the zone attribute will increase in response to the accelerator operation amount, as seen in FIG. 5. In other words, the amount by which the target driving force is compensated based on the zone attribute is increased in regions where the driver depresses the accelerator greatly with the intention of accelerating. Thus, when the driver desires to accelerate on a highway, the target driving force is increased in a faster rate than on a general road. Accordingly, a good response characteristic to the driver's accelerator depression operation can be achieved.

Second Embodiment

Referring now to FIGS. 6–9, a vehicle driving force control apparatus in accordance with a second embodiment will be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 6:
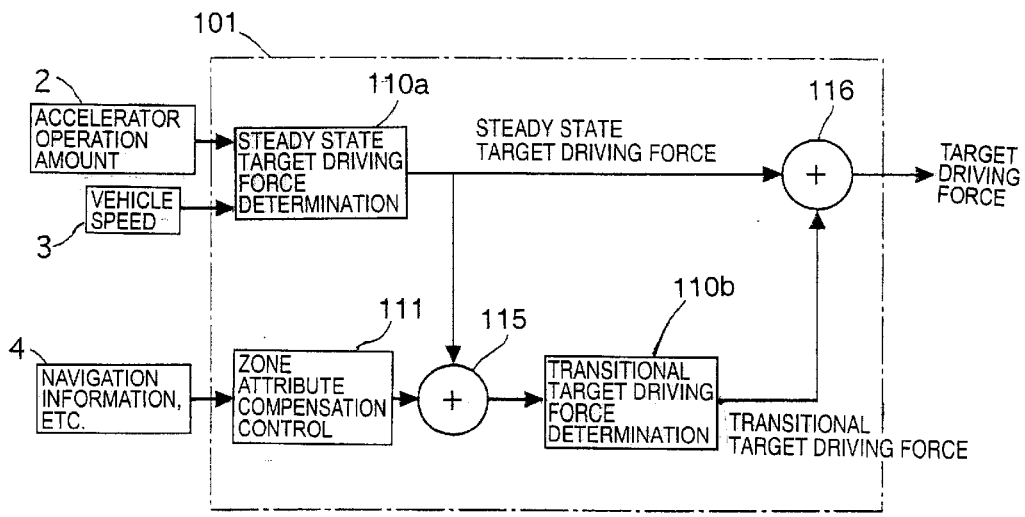
FIG. 6 is a block diagram showing a vehicle driving force control apparatus in accordance with a second embodiment of the present invention.

Basically, the vehicle driving force control apparatus of the second embodiment of the present invention differs from the first embodiment in that a target driving force computing component 101 is used instead of the target driving force computing component 1 of the first embodiment. More specifically, as seen in FIG. 6, the target driving force computing component 101 of the second embodiment includes a steady state target driving force determination section 110a (i.e., target driving force determination section), a transitional target driving force determination section 110b, a zone attribute compensation control section 111, a first adder 115 and a second adder 116. The transitional driving force determination section 110b is configured to compute a compensation amount or a transitional target driving force in response to a change in a steady state target driving force that is determined by the steady state target driving force determination section 110a. In this second embodiment, compensation based on zone attribute is only applied to the transitional target driving force.

More specifically, the steady state target driving force determination section 110a is configured to determine the steady state target driving force based on an accelerator operation amount detected by the requested driving force detecting component 2 and a vehicle speed detected by the vehicle speed detecting component 3. The zone attribute compensation control section 111 is configured to calculate a compensation driving force based on a zone attribute detected by the zone attribute detecting component 4.

The first adder 115 is configured to add the steady state target driving force determined in the steady state target driving force determination section 110a and the compensation driving force calculated in the zone attribute compensation control section 111. The first adder 115 is further configured to output the resulting sum value to the transitional target driving force determination section 110b.

The transitional target driving force determination section 110b is configured to determine the transitional target driving force using the sum of the steady state target driving force determined in the steady state target driving force determination section 110a and the compensation driving force calculated in the zone attribute compensation control section 111 that is inputted from the first adder 115. There are several possible ways for determining the transitional target driving force. For example, when the steady state target driving force changes due to the driver's accelerator operation, the target driving force is preferably compensated based on so called a transient response which is determined based on the change in the steady state target driving force (e.g., the vehicle speed for first order derivative, the acceleration for second order derivative, and higher number derivatives). Accordingly, the target driving force is compensated such that the change in the steady state target driving force is amplified. The transient response as used herein is a frequency characteristic such as "first order delay" used in control engineering. Thus, the transitional target driving force determination section 110b is preferably configured to determine the transitional target driving force based on such a first order delay frequency characteristic. Alternatively, it is also possible to determine the transitional target driving force by referring a prescribed data map for the rate of change in the target driving force and a corresponding compensation value. Of course, it will be apparent to those skilled in the art from this disclosure that other various methods and/or calculations can be utilized to determine the transitional target driving force based on the steady state target driving force determined in the steady state target driving force determination section 110a and the compensation driving force calculated in the zone attribute compensation control section 111.

The transitional target driving force determination section 110b is further configured to output the transitional target driving force to the second adder 116.

The second adder 116 is configured to add the steady state target driving force determined by the steady state target driving force determination section 110a and the transitional target driving force determined by the transitional target driving force determination section 110b. The second adder 116 is configured to set the resulting sum value as a target driving force.

Figure 8:
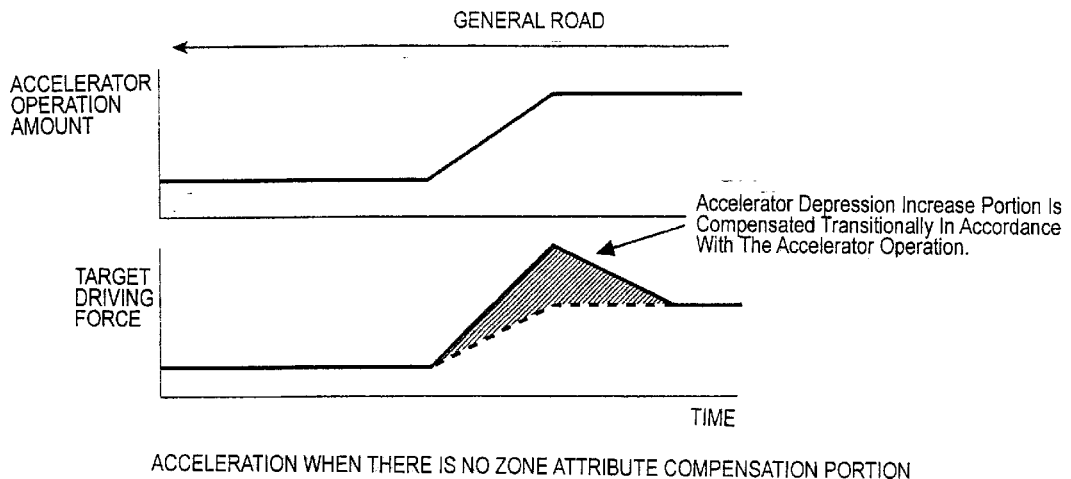
FIG. 8 is a diagram showing an accelerator operation amount characteristic and a target driving force characteristic for a vehicle equipped with the vehicle driving force control apparatus in accordance with the second embodiment of the present invention as the vehicle accelerates on a general road by depressing an accelerator.
Figure 9:
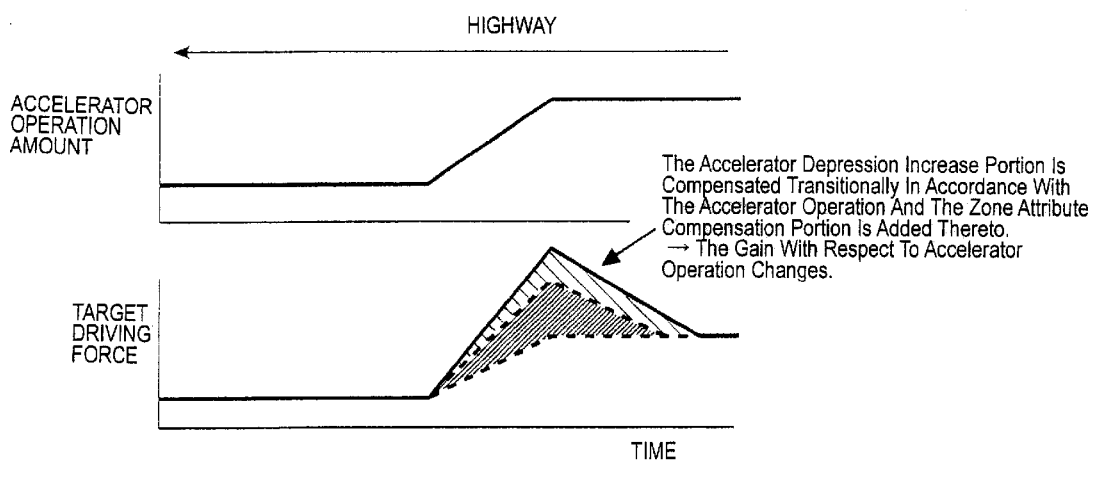
FIG. 9 is a diagram showing an accelerator operation amount characteristic and a target driving force characteristic for the vehicle equipped with the vehicle driving force control apparatus in accordance with the second embodiment of the present invention as the vehicle accelerates on a highway by depressing the accelerator.

Next, referring to FIGS. 7–9, the operation of the vehicle driving force control apparatus in accordance with the second embodiment will be explained. In this second embodiment, when the vehicle is traveling at a constant speed and the driver's accelerator operation amount is constant, a target driving force compensation will occur only in a transitional manner when the zone attribute changes. Otherwise, compensation based on zone attribute will essentially not occur.

Figure 7:
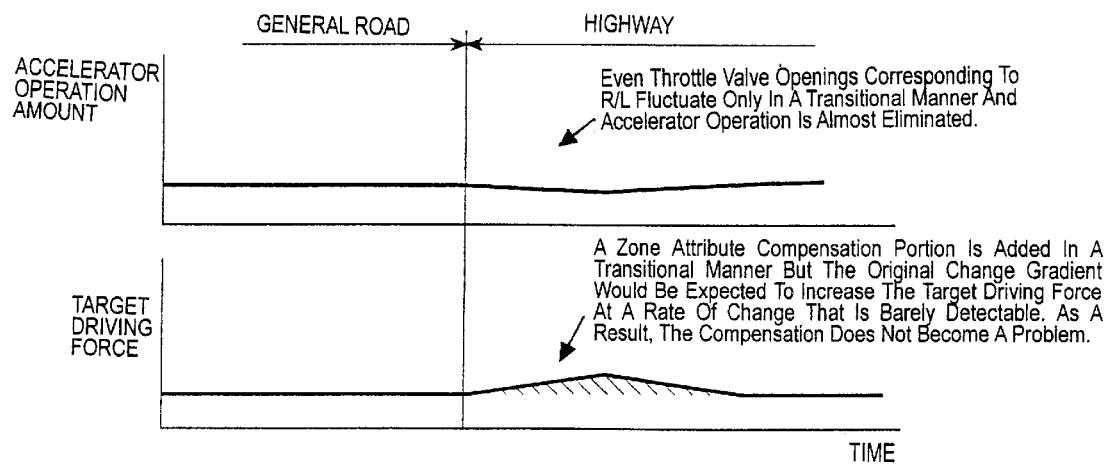
FIG. 7 is a graph showing an accelerator operation amount characteristic and target driving force characteristic for a vehicle equipped with the vehicle driving force control apparatus of the second embodiment of the present invention as the vehicle transfers from a general road to a highway.

In other words, when the zone attribute has changed from general road to highway, the accelerator operation characteristic is as shown in FIG. 7. Accelerator openings corresponding to low-speed travel will fluctuate only in a transitional manner, and thus, an additional accelerator operation is almost eliminated. Also, as seen in FIG. 7, a compensation portion due to a change in zone attributes is added in a transitional manner. However the compensation portion due to a change in zone attributes does not become a problem because the original compensation gradient based on zone attributes would be expected to increase the target driving force at a rate of change that is barely detectable.

When the steady state target driving force changes due to the accelerator operation, the transitional target driving force is computed in accordance with the change in the steady state target driving force. Moreover, a compensation based on the zone attribute is executed only on the transitional target driving force. For example, when the vehicle is on a highway, and thus, the desired acceleration is larger than on a general road, the transitional target driving force will become larger due to the zone attribute compensation portion. Consequently, the change in the driver's desired acceleration caused by the change in zone attribute can be accommodated.

When the accelerator depression amount is increased while on a general road, there is no compensation based on the zone attribute, i.e., because the compensation driving force is zero for a general road. Therefore, the steady state driving force is compensated transitionally by the transitional target driving force determined based on the increase in accelerator depression amount in accordance with the accelerator operation as shown in FIG. 8.

On the other hand, when the accelerator depression amount is increased while on a highway, there is a compensation based on zone attribute, i.e., because the compensation driving force is a positive value for a highway. Thus, the steady state driving force is compensated transitionally by the transitional target driving force determined based on the increase in accelerator depression amount in accordance with the accelerator operation, and the increase in the target driving force due to the transitional target driving force is compensated based on the zone attribute as shown in FIG. 9. As a result, the compensation based on the zone attribute contributes such that the rise in target driving force with respect to the accelerator depression operation has a larger gain and the acceleration is higher than when there is no zone attribute compensation portion as previously described in FIG. 8.

Thus, in this second embodiment, a target driving force can be obtained which both eliminates unnecessary accelerator operation by the driver and responds to zone attribute changes in a highly suitable manner. More specifically, in this second embodiment, the target driving force is increased with a larger gain than in the first embodiment when the larger driving force is desired by the driver while the unnecessary increase of the driving force is eliminated when increasing the driving force is not desirable.

Third Embodiment

Figure 10:
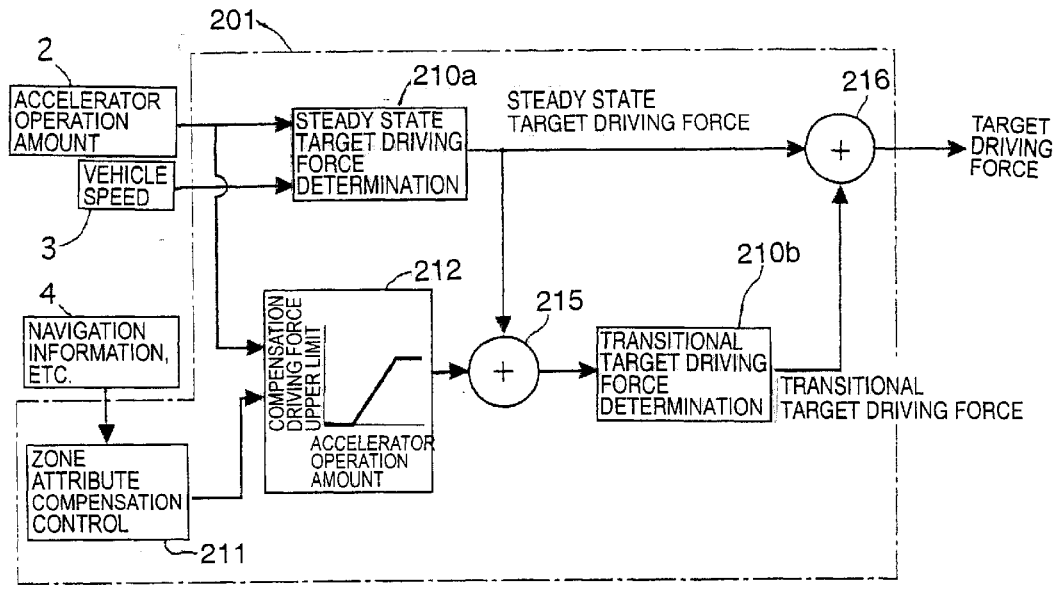
FIG. 10 is a block diagram showing a vehicle driving force control apparatus in accordance with a third embodiment of the present invention.
Figure 11:
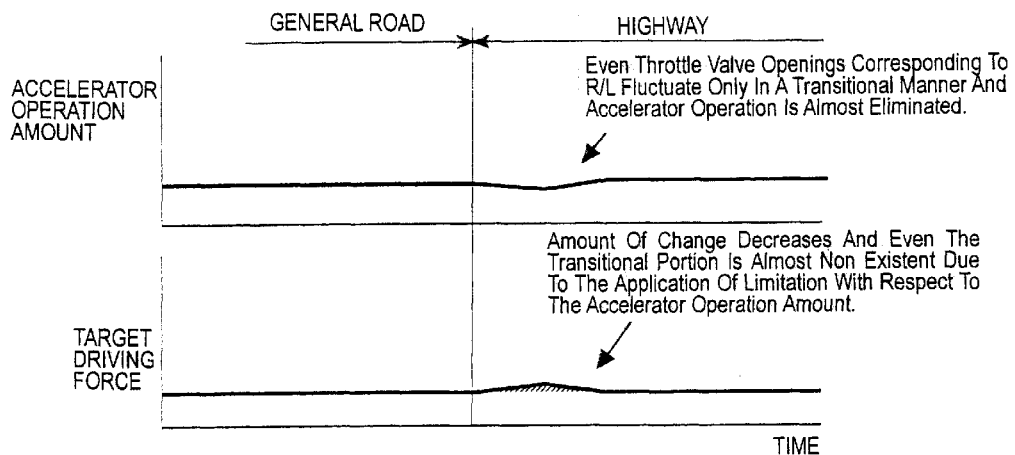
FIG. 11 is a graph showing an accelerator operation amount characteristic and a target driving force characteristic for a vehicle equipped the vehicle driving force control apparatus in accordance with the third embodiment of the present invention as the vehicle transfers from a general road to a highway.
Figure 12:
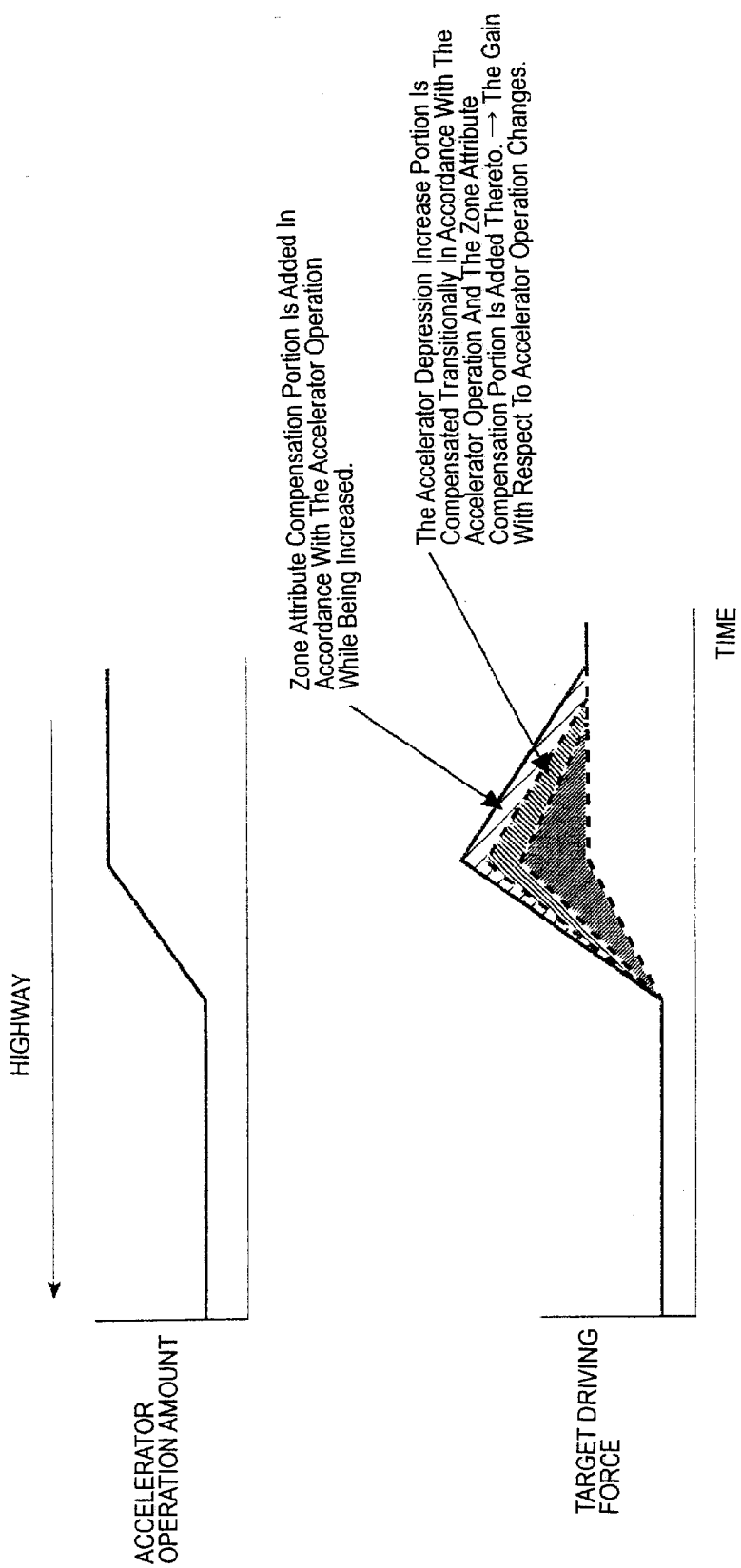
FIG. 12 is a graph showing an accelerator operation amount characteristic and a target driving force characteristic for a vehicle equipped the vehicle driving force control apparatus in accordance with the third embodiment of the present invention as the vehicle accelerates on a highway by depressing an accelerator.

Referring now to FIGS. 10–12, a vehicle driving force control apparatus in accordance with a third embodiment will be explained. In view of the similarity between the first and the third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Basically, the vehicle driving force control apparatus of the third embodiment of the present invention differs from the first embodiment in that a target driving force computing component 201 is used instead of the target driving force computing component 1 of the first embodiment. More specifically, as seen in FIG. 10, the target driving force computing component 201 of the third embodiment includes a steady state target driving force determination section 210a, a transitional target driving force determination section 210b, a zone attribute compensation control section 211, a compensation driving force upper limit value setting section 212, a first adder 215 and a second adder 216. The steady state target driving force determination section 210a is configured to determine a steady state target driving force of the target driving force based on an accelerator operation amount detected by the requested driving force detecting component 2 and a vehicle speed detected by the vehicle speed detecting component 3. The transitional target driving force determination section 210b is configured to determine a transitional target driving force based on a change in the steady state target driving force to compute the compensation amount. In this third embodiment, a compensation based on the zone attribute is applied only to the transitional target driving force. Moreover, the compensation based on the zone attribute is limited with a value determined in the compensation driving force upper limit value setting section 212. The compensation driving force upper limit value setting section 212 is preferably configured to set the upper limit value of the compensation driving force in the same manner as the compensation driving force upper limit value setting section 12 of the first embodiment.

The first adder 215 is configured to add the steady state target driving force determined by the steady state target driving force determination section 210a and the compensation driving force based on the zone attribute that is limited by a value determined in the compensation driving force upper limit value setting section 212. The first adder 215 is further configured to output the sum value to the transitional target driving force determination section 214.

The transitional target driving force determination section 210b is configured to determine the transitional target driving force using the sum of the steady state target driving force determined in the steady state target driving force determination section 210a and the compensation driving force based on the zone attribute that is limited by a value determined in the compensation driving force upper limit value setting section 212 that is inputted from the first adder 215. Similarly to the prior embodiment, there are several possible ways for determining the transitional target driving force. Thus, the transitional target driving force determination section 210b is preferably configured to determine the transitional target driving force based on a first order delay frequency characteristic or a prescribed data map. Of course, it will be apparent to those skilled in the art from this disclosure that other various methods and/or calculations can be utilized to determine the transitional target driving force based on the steady state target driving force determined in the steady state target driving force determination section 210a and the compensation driving force based on the zone attribute that is limited by a value determined in the compensation driving force upper limit value setting section 212.

The transitional target driving force determination section 210b is further configured to output the transitional target driving force to the second adder 216.

The second adder 216 is configured to add the steady state target driving force determined by the steady state target driving force determination section 210a and the transitional target driving force determined by the transitional target driving force determination section 210b. The second adder 216 is configured to set the resulting sum value as a target driving force.

Next, referring to FIGS. 11 and 12, the operation of the vehicle driving force control apparatus in accordance with the third embodiment will be explained. In this third embodiment, when the vehicle is traveling at a constant speed and the driver's accelerator operation amount is constant, the compensation driving force based on the zone attribute can be suppressed in a transitional manner when the zone attribute changes.

In other words, when the zone attribute has changed from general road to highway, the accelerator operation characteristic will be as shown in FIG. 11. In such a case, accelerator openings corresponding to low-speed travel will fluctuate merely in a transitional manner. Therefore, an additional accelerator operation of the driver is almost eliminated. As seen in FIG. 11, a change in the target driving force in this third embodiment is less than the change in the second embodiment as previously described in FIG. 7. Moreover, the compensation portion due to a change in zone attributes is almost nonexistent due to the application of limitation with respect to the accelerator operation amount.

Furthermore, when the target driving force changes due to accelerator operation, a compensation driving force based on the zone attribute increases in accordance with the change in target driving force. Consequently, the driving force used to compute the transitional compensation portion changes to larger degree. As a result, a larger compensation is applied.

In other words, when the accelerator depression amount is increased while on a highway, and thus, there is a compensation based on the zone attribute, the accelerator depression increase portion is compensated transitionally in accordance with the accelerator operation. Moreover, the compensation driving force based on the zone attribute is increased as the accelerator depression amount increases according to a zone attribute compensation driving force upper limit value characteristic as previously described in FIG. 3. Therefore, as shown in FIG. 12, the increasing zone attribute compensation portion is added thereto and contributes to the rise in target driving force. As a result, the rise in target driving force with respect to the accelerator depression operation has a larger gain and the acceleration is higher.

Since the compensation driving force calculated by the zone attribute compensation control section 211 is limited by the upper limit value determined in the compensation driving force upper limit value setting section 212, and the resulting value is used to determine the transitional target driving force, a target driving force can be obtained which both eliminates unnecessary accelerator operation by the driver in an effective manner and responds to zone attribute changes in a highly suitable manner.

Zone Attribute Compensation Control Section 11

Referring now to FIGS. 13–16, one example of the zone attribute compensation control section 11 that can be used in each of the above embodiments will now be described. The zone attribute compensation control section 11 is configured to divide roads into a plurality of types, determine at least one attribute for each road type, and compute a compensation driving force in response to the change in desired driving force due to the attribute of the particular road type. As a result, the compensation driving force, which is responsive to the driver's desired driving force based on the attribute of the road, can be obtained. The zone attribute compensation control section 11 in accordance with the present invention is preferably configured and arranged so as to output one of the following as the zone attribute compensation driving force: a highway compensation driving force (positive value), an alley/narrow road compensation driving force (negative value), or a general road compensation driving force (zero).

Figure 13:
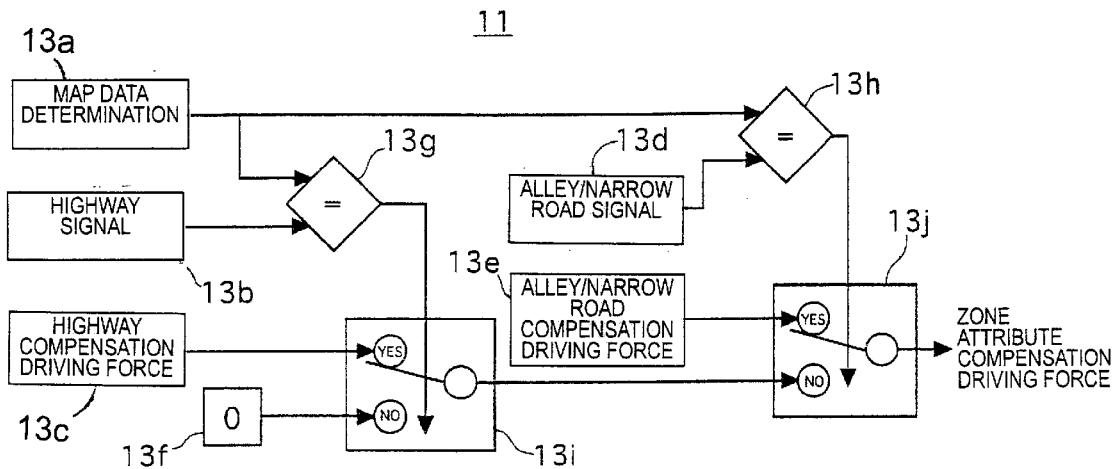
FIG. 13 is a block diagram showing a zone attribute compensation control section that is configured to be used with the vehicle driving force control apparatuses configured in accordance with the first, second or third embodiment of the present invention.

FIG. 13 is a block diagram showing the zone attribute compensation control section 11 of the vehicle driving force control apparatus in accordance with the present invention. The zone attribute compensation control section 11 basically includes a map data determination portion 13a, a highway signal generating portion 13b, a highway compensation driving force setting portion 13c, an alley/narrow road signal generating portion 13d, an alley/narrow road compensation driving force setting portion 13e, a zero setting device 13f, a first comparator 13g, a second comparator 13h, a first switch device 13i, and a second switch device 13j.

The map data determination portion 13a is configured to output signals that correspond to zone attributes of roads on which the vehicle travels when it determines the zone attributes based on vehicle position information and map data from the zone attribute detecting component 4. More specifically, the map data determination portion 13a is configured to output a highway signal when it determines that the vehicle is traveling (according to the map) on a highway or other similar road where the vehicle speed is high during steady state travel. Moreover, the map data determination portion 13a is configured to output an alley/narrow road signal when it determines that the vehicle is traveling (according to the map) on an alley, narrow road, or other similar road where the vehicle speed is low during steady state travel.

The highway signal generation portion 13b is configured to produce a reference (highway) signal that is equivalent to a signal outputted from the map data determination section 13a, which indicates that the vehicle is traveling on a road with a zone attribute of a highway.

Figure 14:
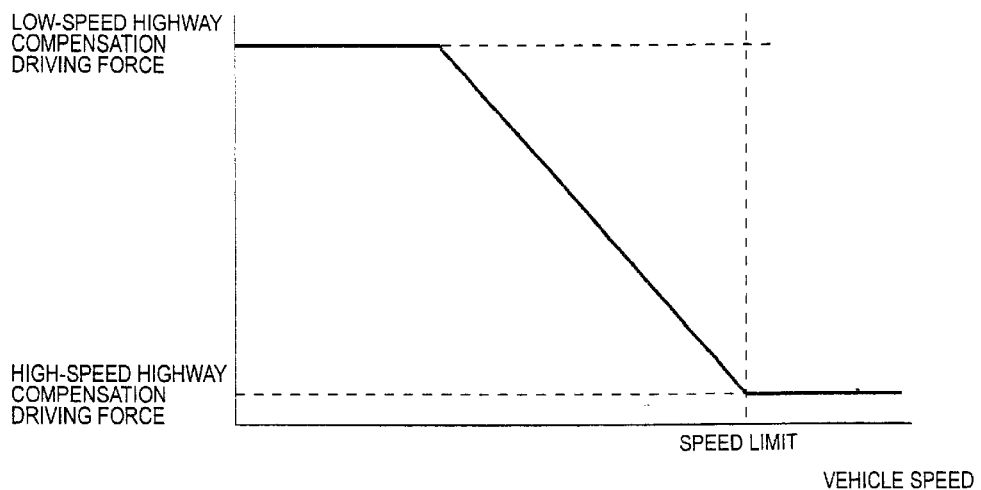
FIG. 14 is a graph showing a highway compensation driving force characteristic that is utilized in the zone attribute compensation control section illustrated in FIG. 13.

The highway compensation driving force setting portion 13c is configured to set the highway compensation driving force such that the lower the vehicle speed is the larger the highway compensation driving force is, as shown in FIG. 14. As a result, a characteristic can be created that allows high acceleration to be obtained readily when traveling on a low vehicle speed region of a highway and enables stable travel with the flow when traveling on a high vehicle speed region of the highway. More specifically, when traveling on a highway or a similar high speed road, the low vehicle speed region is generally a region from which high acceleration is executed in order to join the flow of traffic on the highway. After the vehicle has accelerated to the vicinity of the speed limit, high acceleration is no longer requested because the vehicle is required merely to maintain a state of traveling with the flow of the traffic. Thus, the highway compensation driving force setting portion 13c is configured to set the highway compensation driving force in response to the vehicle speed as shown in FIG. 14.

The alley/narrow road signal generating portion 13d is configured to produce a reference (alley/narrow road) signal that is equivalent to a signal outputted from the map data determination section 13a, which indicates that the vehicle is traveling on a road with a zone attribute of an alley/narrow road.

The alley/narrow road compensation driving force setting portion 13e is configured to set a negative-valued alley/narrow road compensation driving force.

The first comparator 13g is configured to output a command instructing the first switch device 13i to switch from the NO position to the YES position when highway signals that are equal are outputted from both the map data determination portion 13a and the highway signal generating portion 13b.

The second comparator 13h is configured to output a command instructing the second switch device 13j to switch from the NO position to the YES position when alley/narrow road signals that are equal are outputted from both the map data determination portion 13a and the alley/narrow road signal generating portion 13d.

Additionally, the first comparator 13g is further configured to add a highway compensation driving force to the target driving force upon switching from zero compensation driving force to highway compensation driving force. Moreover, the first comparator 13g is configured to increase the compensation driving force at a prescribed rate of change until the highway compensation driving force is reached. As a result, the driving force can be increased smoothly while maintaining stable vehicle behavior.

Additionally, the second comparator 13h is further configured to subtract an alley/narrow road compensation driving force from the target driving force upon switching from zero driving force to alley/narrow road compensation driving force. The second comparator 13h is configured to decrease the compensation driving force at a prescribed rate of change until the alley/narrow road compensation driving force is reached. As a result, the driving force can be decreased smoothly while maintaining stable vehicle behavior.

Figure 15:
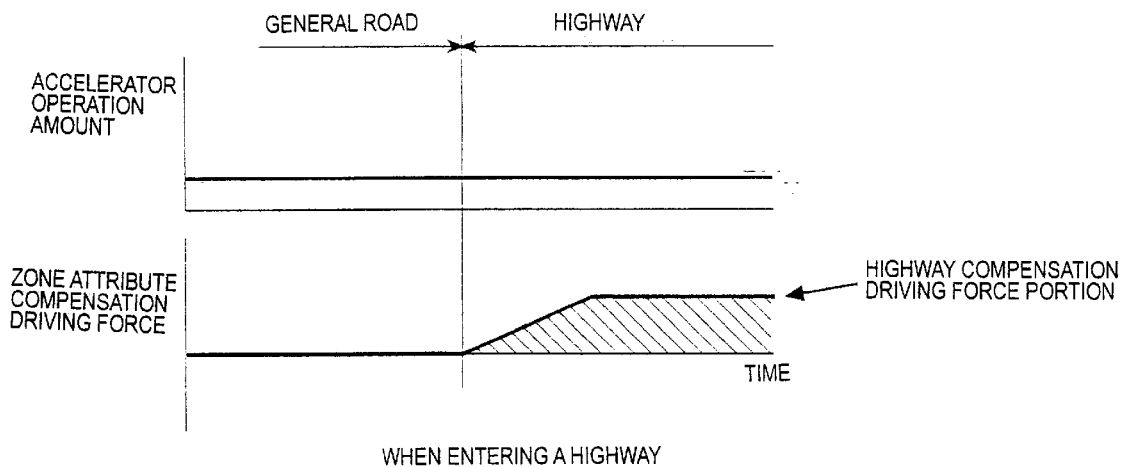
FIG. 15 is a diagram showing an accelerator operation amount characteristic and a target driving force characteristic for a vehicle equipped with a vehicle driving force control apparatus including the zone attribute compensation control section illustrated in FIG. 13 as the vehicle transfers from a general road to a highway.

When the vehicle transfers from a general road to a highway, the first switch device 13i switches from the NO position to the YES position and the second switch device 13*j* remains in the NO position. As a result, the zone attribute compensation driving force changes from a zero driving force to a highway compensation driving force. In other words, as shown in FIG. 15, when the vehicle transfers to a highway from a general road, the target driving force increases by an amount that increases gradually from zero to the highway compensation driving force. Accordingly, the target driving force is gradually adjusted to a value to which prescribed highway compensation driving force portion have been added.

Consequently, as shown in FIG. 15, the driving force increases even if the accelerator operation amount remains the same. In other words, the vehicle accelerates smoothly in response to the change in the driver's desired acceleration distribution that changes as the zone attribute changes from general road to highway.

Figure 16:
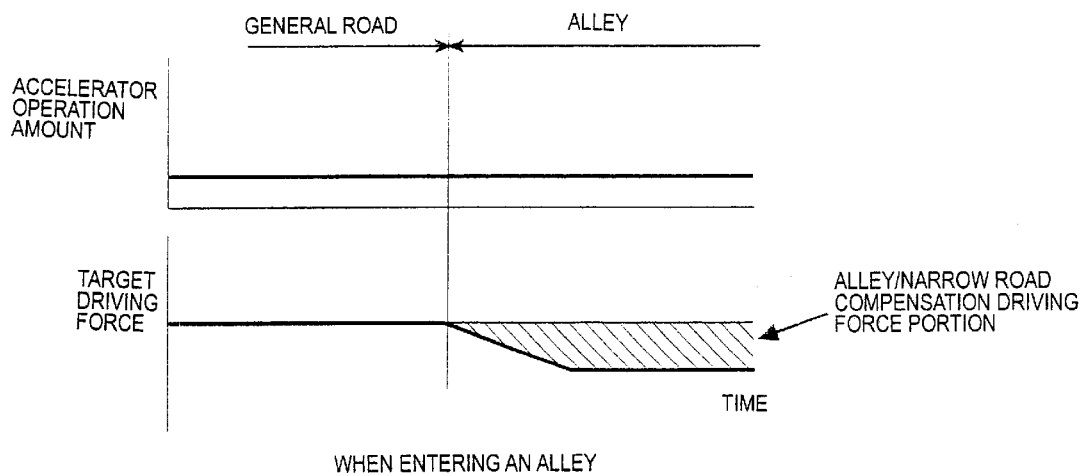
FIG. 16 is a graph showing an accelerator operation amount characteristic and a target driving force characteristic for the vehicle equipped with a vehicle driving force control apparatus including the zone attribute compensation control section illustrated in FIG. 13 as the vehicle transfers from a general road to an alley/narrow road.

On the other hand, when the vehicle transfers from a general road to an alley, the first switch device 13*i* remains in the NO position and the second switch device 13*j* switches from the NO position to the YES position. As a result, the zone attribute compensation driving force changes from zero driving force to alley/narrow road compensation driving force, which is set to a negative value. As shown in FIG. 16, when the vehicle transfers to an alley from a general road, the target driving force decreases by an amount that decreases gradually from zero to the alley/narrow road compensation driving force. Accordingly, the target driving force is gradually adjusted to a value from which the set alley/narrow road compensation driving force portion has been subtracted.

Consequently, as shown in FIG. 16, the driving force decreases even if the accelerator operation amount remains the same and the vehicle decelerates smoothly in response to the change in the driver's desired acceleration distribution that changes as the zone attribute changes from general road to alley/narrow road.

Alternate Zone Attribute Compensation Control Section 11*a*

Figure 17:
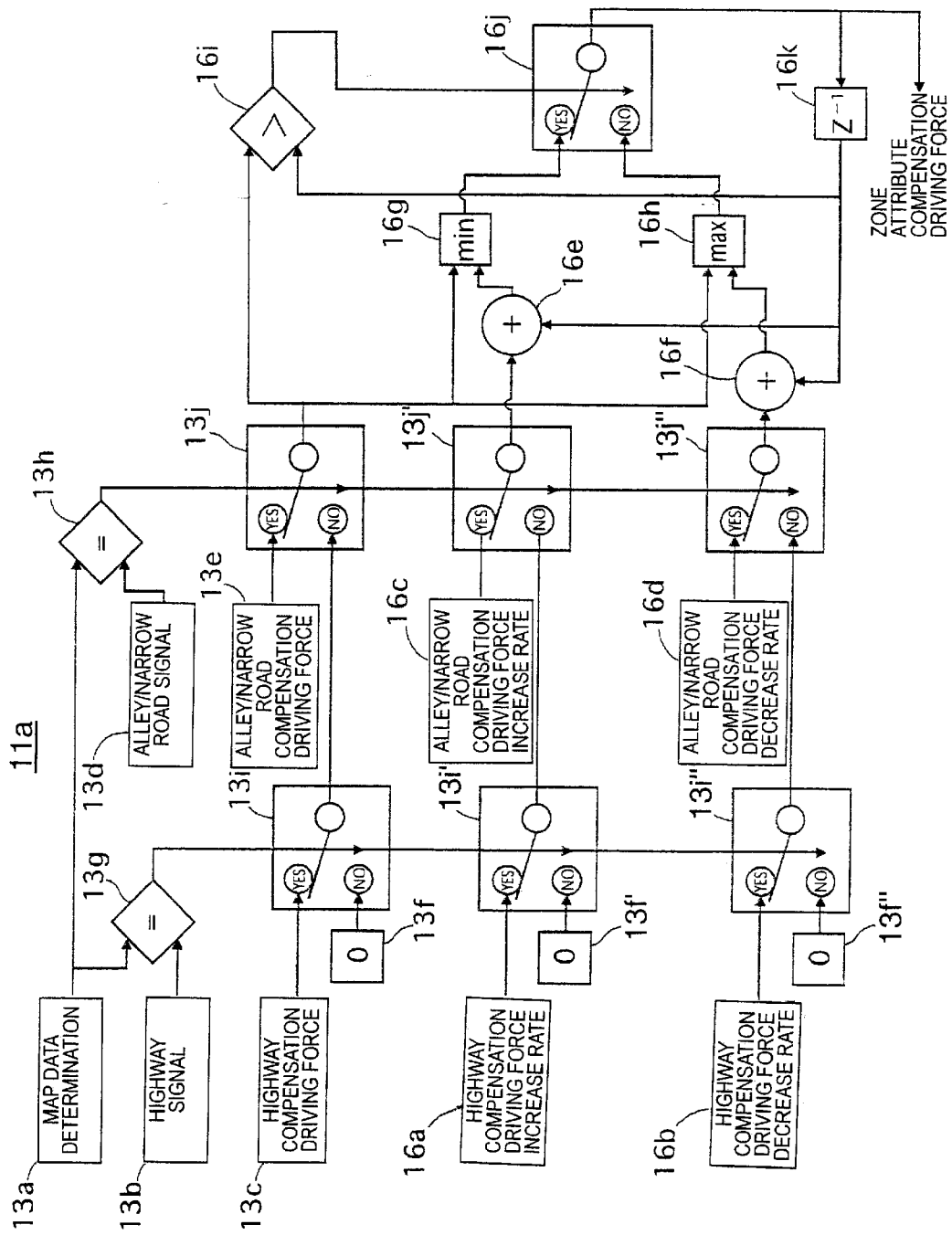
FIG. 17 is a block diagram showing an alternate zone attribute compensation control section that is configured to be used with the vehicle driving force control apparatuses configured in accordance with the first, second or third embodiment of the present invention.

Referring now to FIG. 17, alternate zone attribute compensation control section 11*a* will be described in accordance with the present invention. The alternate zone attribute compensation control section 11*a* can be replaced with the zone attribute compensation control section 11 described above. Thus, the alternate zone attribute compensation control section 11*a* can be used in each of the above embodiments of the present invention. In view of the similarity between the zone attribute compensation control section 11 and the alternate zone attribute compensation control section 11*a*, the parts of the alternate zone attribute compensation control section 11*a* that are identical to the parts of the zone attribute compensation control section 11 will be given the same reference numerals as the parts of the zone attribute compensation control section 11. Moreover, the descriptions of the parts of the alternate zone attribute compensation control section 11*a* that are identical to the parts of the zone attribute compensation control section 11 may be omitted for the sake of brevity.

The desired deceleration rate of the vehicle speed when the vehicle is entering a general road from a highway is different from the desired deceleration rate of the vehicle speed when the vehicle is entering to an alley from a highway. Accordingly, the compensation driving force should be set to decrease at a prescribed decrease rate depending upon which zones the vehicle is transferring to and from. In other words, the prescribed decrease rate of the compensation driving force for entering a general road from a highway should be different from the prescribed decrease rate of the compensation driving force for entering an alley from a general road. Therefore, it is desired to set a prescribed optimum rate of change with prescribed increase and decrease rates of the compensation driving force that corresponds to each situation and each zone attribute.

Accordingly, the alternate zone attribute compensation control section 11*a* is further configured to set the prescribed increase and decrease rates of the compensation driving force based on the attribute of the road type when a zone attribute compensation driving force is outputted. In the alternate zone attribute compensation control section 11*a*, when the vehicle enters a general road from a highway, the compensation driving force based on the zone attribute is decreased according to a prescribed optimum decrease rate. Moreover, when the vehicle enters an alley from a general road, the compensation driving force based on the zone attribute is decreased according to a different prescribed optimum decrease rate. A similar arrangement exists for the prescribed increase rates of the compensation driving force based on the zone attribute. As a result, the zone attribute compensation driving force can be increased and decreased smoothly at optimum driving force increase and decrease rates that correspond to the zone attributes.

As seen in FIG. 17, the alternate zone attribute compensation control section 11*a* includes a map data determination portion 13*a*, a highway signal generating portion 13*b*, a highway compensation driving force setting portion 13*c*, an alley/narrow road signal generating portion 13*d*, an alley/narrow road compensation driving force setting portion 13*e*, a zero setting device 13*f*, a first comparator 13*g*, a second comparator 13*h*, a first switch device 13*i*, and a second switch device 13*j*. These portions and devices basically function as the same portions and devices of the zone attribute compensation control section 11 that are given the same reference numerals.

The alternate zone attribute compensation control section 11*a* further includes a highway compensation driving force increase rate setting portion 16*a*, a highway compensation driving force decrease rate setting portion 16*b*, an alley/narrow road compensation force increase rate setting portion 16*c*, an alley/narrow road compensation force decrease rate setting portion 16*d*, a first adder 16*e*, a second adder 16*f*, a minimum value selector 16*g*, a maximum value selector 16*h*, a third comparator 16*i*, a third switching device 16*j*, an delaying device 16*k*, zero setting devices 13*f'* and 13*f''*, first switch devices 13*i'* and 13*i'''*, and second switch devices 13*j'* and 13*j''*.

The highway compensation driving force increase rate setting portion 16*a* is configured to set the prescribed optimum rate of change of the compensation driving force to increase at the prescribed optimum increase rate (i.e., amount of compensation driving force increase per processing cycle) when the vehicle enters a highway from a general road.

The highway compensation driving force decrease rate setting portion 16*b* is configured to set the prescribed optimum rate of change of the compensation driving force to decrease at the prescribed optimum decrease rate (i.e., amount of compensation driving force decrease per processing cycle) when the vehicle enters a general road from a highway.

The alley/narrow road compensation driving force increase rate setting portion 16*c* is configured to set the prescribed optimum rate of change of the compensation driving force to increase at the prescribed optimum increase rate (i.e., amount of compensation driving force increase per processing cycle) when the vehicle enters a general road from an alley.

The alley/narrow road compensation driving force decrease rate setting portion 16d is configured to set the prescribed optimum rate of change of compensation driving force to decrease prescribed optimum decrease rate (i.e., amount of compensation driving force decrease per processing cycle) when the vehicle enters an alley from a general road.

Accordingly, by setting a prescribed optimum increase or decrease rate for each road attribute change mode (i.e., entering a highway from a general road, entering a general road from a highway, entering a general road from an alley, and entering an alley from a general road), the zone attribute compensation driving force can always be increased or decreased at the optimum increase rate or decrease rate that correspond to each zone attribute.

The first adder 16e is configured to add the prescribed increase rate that is determined by either the highway compensation driving force increase rate setting portion 16a or the alley/narrow road compensation driving force increase rate setting portion 16c to the zone attribute compensation driving force of the previous cycle to obtain the zone attribute compensation driving force for the current cycle. The first adder 16e is further configured to output the-result to the minimum value selector 16g.

The second adder 16f is configured to add the prescribed decrease rate that is determined by either the highway compensation driving force decrease rate setting portion 16b or the alley/narrow road compensation driving force decrease rate setting portion 16d to the zone attribute compensation driving force of the previous cycle to obtain the zone attribute compensation driving force for the current cycle. The second adder 16f is further configured to output the result to maximum value selector 16h.

The minimum value selector 16g is configured to select the minimum value between the compensation driving force (target value) selected at that time and the zone attribute compensation driving force of the current cycle that is inputted by the first adder 16e when the driving force is being adjusted to a larger value.

The maximum value selector 16h is configured to select the maximum [minimum] value between the compensation driving force (target value) selected at that time and the zone attribute compensation driving force of the current cycle that is inputted by the second adder 16f when the driving force is being adjusted to a smaller value.

The third comparator 16i is configured to compare the zone attribute compensation driving force of the previous cycle to the compensation driving force (target driving force) selected. The third comparator 16i is further configured to set the third switch device 16j to the YES position when the driving force is being adjusted to a larger value and to the NO position when the driving force is being adjusted to a smaller value.

The delaying device 16k is configured to output the zone attribute compensation driving force of the previous cycle, which is delayed with respect to the currently outputted zone attribute compensation driving force, to the first adder 16e, second adder 16f, and third switch device 16j.

As used herein to describe the preceding embodiments of the present invention, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-141528. The entire disclosure of Japanese Patent Application No. 2002-141528 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle driving force control apparatus comprising:
   a zone attribute detecting component configured and arranged to detect at least two different zones with different zone attributes in which a vehicle travels;
   a requested driving force detecting component configured and arranged to detect a requested driving force requested by a driver; and
   a target driving force computing component configured to calculate a target driving force based on a requested driving force that is adjusted by a final compensation driving force, the target driving force computing component including
      a zone attribute compensation control section being configured to calculate a compensation driving force according to which of the zone attributes is being detected,
      a compensation driving force upper limit value setting section being configured to set an upper limit value for the compensation driving force according to an amount of the requested driving force that is detected by the requested driving force detecting component,
   the target driving force computing component being further configured to set the final compensation driving force as a value that is obtained by limiting the compensation driving force calculated by the zone attribute compensation control section with the upper limit value of the compensation driving force.

2. The vehicle driving force control apparatus as recited in claim 1, wherein the requested driving force detecting component is an accelerator operation amount detecting device that is configured and arranged to detect an accelerator operation amount.

3. The vehicle driving force control apparatus as recited in claim 2, wherein
the compensation driving force upper limit value setting section is further configured to set the upper limit value of the compensation driving force to a minimum compensation driving force when the accelerator operation amount is less than or equal to a first prescribed operation amount, to a value that is proportional to the accelerator operation amount when the accelerator operation amount is between the first prescribed operation amount and a second prescribed operation amount, and to a maximum compensation driving force when the accelerator operation amount is equal to or more than the second prescribed operation amount.

4. The vehicle driving force control apparatus as recited in claim 1, wherein
the compensation driving force upper limit value setting section is further configured not to limit the compensation driving force based on the requested driving force when the target driving force is decreased by the compensation driving force calculated by the zone attribute correction control section.

5. The vehicle driving force control apparatus as recited in claim 3, wherein
the compensation driving force upper limit value setting section is further configured not to limit the compensation driving force based on the requested driving force when the target driving force is decreased by the compensation driving force calculated by the zone attribute correction control section.

6. A vehicle driving force control apparatus comprising:
a zone attribute detecting component configured and arranged to detect at least one zone attribute corresponding of zones in which a vehicle travels; and
a target driving force computing component configured to calculate a target driving force based on a requested driving force that is adjusted by a transitional target driving force, the target driving force computing component including
a zone attribute compensation control section being configured to calculate a compensation driving force according to which of the zone attributes is being detected, and
a transitional target driving force determination section configured to calculate the transitional target driving force based on the compensation driving force calculated by the zone attribute compensation control section when the vehicle is determined to be traveling in a non-steady state.

7. The vehicle driving force control apparatus as recited in claim 6, wherein
the target driving force computing component further includes a steady state target driving force determination section being configured and arranged to determine a steady state target driving force based on at least an accelerator operation amount and a vehicle speed, and
the transitional target driving force determination section is further configured to determine the transitional target driving force using a sum of the steady state target driving force determined by the steady state target driving force determination section and the compensation driving force calculated by the zone attribute compensation control section.

8. The vehicle driving force control apparatus as recited in claim 6, further comprising
a requested driving force detecting component configured and arranged to detect the requested driving force,
the target driving force computing component further including a compensation driving force upper limit value setting section being configured and arranged to set an upper limit value for the compensation driving force according to a value of the requested driving force detected by the requested driving force detecting component, and
the transitional target driving force determination section being further configured and arranged to set the transitional target driving force based on the compensation driving force limited by the upper limit value of the compensation driving force.

9. The vehicle driving force control apparatus as recited in claim 1, wherein
the zone attribute compensation control section is further configured to set the zone attributes based on a plurality of road types.

10. The vehicle driving force control apparatus as recited in claim 9, wherein
the zone attribute compensation control section is further configured to set the compensation driving force to a larger value when the zone attribute detecting component detects transferring to a high-speed road from a lower speed road.

11. The vehicle driving force control apparatus as recited in claim 10, wherein
the zone attribute compensation control section is further configured to increase the compensation driving force in response to a decrease of the vehicle speed.

12. The vehicle driving force control apparatus as recited in claim 9, wherein
the zone attribute compensation control section is further configured to set the compensation driving force to a smaller value when the zone attribute detecting component detects transferring to a low-speed road from a higher speed road.

13. The vehicle driving force control apparatus as recited in claim 9, wherein
the zone attribute compensation control section is further configured to adjust the compensation driving force at a prescribed rate of change when the zone attribute compensation control section adjusts the target driving force due to a change in the zone attribute detected by the zone attribute detecting component.

14. The vehicle driving force control apparatus as recited in claim 13, wherein
the zone attribute compensation control section is further configured to set the prescribed rate of change of the compensation driving force based on the zone attribute detected by the zone attribute detecting component.

15. The vehicle driving force control apparatus as recited in claim 14, wherein
the zone attribute compensation control section is further configured such that the prescribed rate of change of the compensation driving force is set to increase at a first prescribed increase rate when the vehicle travels from a first zone of the zones to a second zone of the zones with a higher vehicle traveling speed then the first zone, and such that the prescribed rate of change of the compensation driving force is set to decrease at a first prescribed decrease rate when the vehicle travels from the second zone of the zones to the first zone of the zones.

16. The vehicle driving force control apparatus as recited in claim 15, wherein
the zone attribute compensation control section is further configured such that the prescribed rate of change of the compensation driving force is set to increase at a second prescribed increase rate when the vehicle travels from a third zone of the zones to the first zone of the zones with a higher vehicle traveling speed than the third zone, and such that the prescribed rate of change of the compensation driving force is set to decrease at a second prescribed decrease rate when the vehicle travels from the first zone of the zones to the third zone of the zones with a lower vehicle traveling speed.

17. The vehicle driving force control apparatus as recited in claim 6, wherein
the zone attribute compensation control section is further configured to set the zone attributes based on a plurality of road types.

18. The vehicle driving force control apparatus as recited in claim 17, wherein
the zone attribute compensation control section is further configured to set the compensation driving force to a larger value when the zone attribute detecting component detects transferring to a high-speed road from a lower speed road.

19. The vehicle driving force control apparatus as recited in claim 18, wherein
the zone attribute compensation control section is further configured to increase the compensation driving force in response to a decrease of the vehicle speed.

20. The vehicle driving force control apparatus as recited in claim 17, wherein
the zone attribute compensation control section is further configured to set the compensation driving force to a smaller value when the zone attribute detecting component detects transferring to a low-speed road from a higher speed road.

21. The vehicle driving force control apparatus as recited in claim 17, wherein
the zone attribute compensation control section is further configured to adjust the compensation driving force at a prescribed rate of change when the zone attribute compensation control section adjusts the target driving force due to a change in the zone attribute detected by the zone attribute detecting component.

22. The vehicle driving force control apparatus as recited in claim 21, wherein
the zone attribute compensation control section is further configured to set the prescribed rate of change of the compensation driving force based on the zone attribute detected by the zone attribute detecting component.

23. The vehicle driving force control apparatus as recited in claim 22, wherein
the zone attribute compensation control section is further configured such that the prescribed rate of change of the compensation driving force is set to increase at a first prescribed increase rate when the vehicle travels from a first zone of the zones to a second zone of the zones with a higher vehicle traveling speed then the first zone, and such that the prescribed rate of change of the compensation driving force is set to decrease at a first prescribed decrease rate when the vehicle travels from the second zone of the zones to the first zone of the zones.

24. The vehicle driving force control apparatus as recited in claim 23, wherein
the zone attribute compensation control section is further configured such that the prescribed rate of change of the compensation driving force is set to increase at a second prescribed increase rate when the vehicle travels from a third zone of the zones to the first zone of the zones with a higher vehicle traveling speed than the third zone, and such that the prescribed rate of change of the compensation driving force is set to decrease at a second prescribed decrease rate when the vehicle travels from the first zone of the zones to the third zone of the zones with a lower vehicle traveling speed.

25. The vehicle driving force control apparatus as recited in claim 8, wherein
the zone attribute compensation control section is further configured to set the zone attributes based on a plurality of road types.

26. The vehicle driving force control apparatus as recited in claim 25, wherein
the zone attribute compensation control section is further configured to set the compensation driving force to a larger value when the zone attribute detecting component detects transferring to a high-speed road from a lower speed road.

27. The vehicle driving force control apparatus as recited in claim 26, wherein
the zone attribute compensation control section is further configured to increase the compensation driving force in response to a decrease of the vehicle speed.

28. The vehicle driving force control apparatus as recited in claim 25, wherein
the zone attribute compensation control section is further configured to set the compensation driving force to a smaller value when the zone attribute detecting component detects transferring to a low-speed road from a higher speed road.

29. The vehicle driving force control apparatus as recited in claim 25, wherein
the zone attribute compensation control section is further configured to adjust the compensation driving force at a prescribed rate of change when the zone attribute compensation control section adjusts the target driving force due to a change in the zone attribute detected by the zone attribute detecting component.

30. The vehicle driving force control apparatus as recited in claim 29, wherein
the zone attribute compensation control section is further configured to set the prescribed rate of change of the compensation driving force based on the zone attribute detected by the zone attribute detecting component.

31. The vehicle driving force control apparatus as recited in claim 30, wherein
the zone attribute compensation control section is further configured such that the prescribed rate of change of the compensation driving force is set to increase at a first prescribed increase rate when the vehicle travels from a first zone of the zones to a second zone of the zones with a higher vehicle traveling speed then the first zone, and such that the prescribed rate of change of the compensation driving force is set to decrease at a first prescribed decrease rate when the vehicle travels from the second zone of the zones to the first zone of the zones.

32. The vehicle driving force control apparatus as recited in claim 31, wherein
the zone attribute compensation control section is further configured such that the prescribed rate of change of the compensation driving force is set to increase at a second prescribed increase rate when the vehicle travels from a third zone of the zones to the first zone of the zones with a higher vehicle traveling speed than the third zone, and such that the prescribed rate of change of the compensation driving force is set to decrease at a second prescribed decrease rate when the vehicle travels from the first zone of the zones to the third zone of the zones with a lower vehicle traveling speed.

33. A method of controlling a vehicle driving force comprising:

detecting a requested driving force that is requested by a driver of the vehicle;

detecting a first zone with a first zone attribute when the vehicle is traveling in the first zone;

detecting a second zone with a second zone attribute when the vehicle is traveling in the second zone;

determining a compensation driving force based on which of the first and second zones is being detected;

limiting the compensation driving force based on the amount of the requested driving force that being detected; and computing a target driving force by adjusting the requested driving force by the compensation driving force that has been limited by the amount of the requested driving force.

34. A method of controlling a vehicle driving force comprising:

detecting a first zone with a first zone attribute when a vehicle is traveling in the first zone;

detecting a second zone with a second zone attribute when the vehicle is traveling in the second zone;

determining a compensation driving force based on which of the first and second zones is being detected; and computing a target driving force by adjusting a requested driving force by the compensation driving force when a change in the vehicle is accelerating or decelerating.

35. A vehicle driving force control apparatus comprising:

zone attribute detecting means for detecting at least two different zones with different zone attribute in which a vehicle travels;

requested driving force detecting means for detecting a requested driving force that is requested by a driver;

compensation driving force computing means for computing a compensation driving force based on which of the first and second zones is being detected; and target driving force computing means for computing a target driving force that is adjusted by the compensation driving force and that is limited based on the amount of the requested driving force that being detected.

36. A vehicle driving force control apparatus comprising:

zone attribute detecting means for detecting at least two different zones with different zone attributes in which a vehicle travels;

compensation driving force computing means for computing a compensation driving force based on which of the zones is being detected; and target driving force computing means for computing a target driving force that is adjusted by adjusting a requested driving force by the compensation driving force when a change in the vehicle is accelerating or decelerating.

* * * * *